US009253635B2

(12) United States Patent
Berenberg et al.

(10) Patent No.: US 9,253,635 B2
(45) Date of Patent: Feb. 2, 2016

(54) LOW POWER WIRELESS NETWORK FOR TRANSPORTATION AND LOGISTICS

(75) Inventors: Paul Berenberg, Mountain View, CA (US); Igor Ryshakov, Mountain View, CA (US); Dongyan Chen, Metairie, LA (US); Georgi Danielyan, Yerevan (AM)

(73) Assignee: Cubic Corporation, San Diego, CA (US)

( * ) Notice: Subject to any disclaimer, the term of this patent is extended or adjusted under 35 U.S.C. 154(b) by 13 days.

(21) Appl. No.: 13/023,673

(22) Filed: Feb. 9, 2011

(65) Prior Publication Data

US 2012/0203918 A1    Aug. 9, 2012

(51) Int. Cl.
*G06F 15/16* (2006.01)
*H04W 12/06* (2009.01)
*H04W 52/02* (2009.01)

(52) U.S. Cl.
CPC .......... *H04W 12/06* (2013.01); *H04W 52/0216* (2013.01)

(58) Field of Classification Search
CPC . H04L 9/32; H04L 29/12962; H04L 61/6081; H04W 84/18
USPC .................. 709/224, 229, 235, 239; 380/270; 370/311, 242, 244
See application file for complete search history.

(56) References Cited

U.S. PATENT DOCUMENTS

| 5,585,571 | A  | * | 12/1996 | Lonsdale et al. | ......... 73/862.325 |
|---|---|---|---|---|---|
| 6,493,824 | B1 | * | 12/2002 | Novoa et al. | .................. 713/162 |
| 6,515,967 | B1 | * | 2/2003 | Wei et al. | ...................... 370/244 |
| 8,069,470 | B1 | * | 11/2011 | Montenegro | ...................... 726/3 |
| 2004/0006705 | A1 | * | 1/2004 | Walker | ........................... 713/200 |
| 2004/0042434 | A1 | | 3/2004 | Kennedy | |
| 2005/0261037 | A1 | | 11/2005 | Raghunath et al. | |
| 2006/0149980 | A1 | | 7/2006 | Zhong | |
| 2006/0291657 | A1 | * | 12/2006 | Benson et al. | ................ 380/270 |
| 2007/0080800 | A1 | | 4/2007 | Carbone | |
| 2008/0181154 | A1 | | 7/2008 | Sherman | |
| 2009/0059827 | A1 | | 3/2009 | Liu et al. | |
| 2010/0046375 | A1 | * | 2/2010 | Goldstein et al. | ............. 370/237 |
| 2010/0283575 | A1 | | 11/2010 | Tubb et al. | |

(Continued)

FOREIGN PATENT DOCUMENTS

KR    10-2005-0104393 A    11/2005
KR    10-2010-0112869 A    10/2010

OTHER PUBLICATIONS

Dust Networks, "SmartMesh Technology Overview", obtained online on Dec. 2, 2010 at http://dustnetworks.com/technology, 4 pages.

(Continued)

*Primary Examiner* — Vivek Srivastava
*Assistant Examiner* — Karina J Garcia-Ching
(74) *Attorney, Agent, or Firm* — Kilpatrick Townsend & Stockton LLP

(57) ABSTRACT

Embodiments of methods and devices are disclosed for enabling network devices to join a network. These embodiments generally include a first network device, which is joined to the network, sending authentication information. If the authentication information is determined as valid by a second network device, the second network device sends a join request toward the first network device. During or after the joining process, the first and second network devices can share scheduling information. These embodiments enable a network to have additional security while consuming low amounts of power.

27 Claims, 10 Drawing Sheets

(56) References Cited

U.S. PATENT DOCUMENTS

2010/0329232 A1    12/2010   Tubb et al.
2011/0298598 A1*   12/2011   Rhee .................. 340/286.02
2012/0275360 A1    11/2012   Berenberg
2012/0275361 A1    11/2012   Berenberg et al.

OTHER PUBLICATIONS

International Search Report and Written Opinion dated Apr. 16, 2012 for International Application No. PCT/US2011/034454, 6 pages.
International Search Report and Written Opinion dated Feb. 23, 2012 for International PCT Application No. PCT/US2011/034436, 7 pages.
Polastre, Joseph et al., "A unifying link abstraction for wireless sensor networks", Proceedings of the $3^{rd}$ International Conference on Embedded Networked Sensor Systems: ACM NY pp. 76-89, Nov. 2-4, 2005.
Zheng, Jianliang et al., A comprehensive performance study of IEEE 802.15.4, pp. 1-14.

* cited by examiner

LOW POWER WIRELESS NETWORK FOR TRANSPORTATION AND LOGISTICS

STATEMENT AS TO RIGHTS TO INVENTIONS MADE UNDER FEDERALLY SPONSORED RESEARCH AND DEVELOPMENT

The U.S. Government may have rights in this invention pursuant to Contract No. 1406-04-06-CT-60916.

BACKGROUND OF THE INVENTION

Modern networks can comprise a variety of devices, which may be connected in a variety of ways. A network can be, for example, centralized or ad hoc. In the latter case, each networked device, or node, can act as a router to forward data from other nodes, in addition to communicating its own data.

These wireless networks, however, have their limitations. For example, wireless connections are vulnerable to security breaches, such as replay attacks. Additionally, wireless devices powered by batteries may require frequent battery changes due to the high power cost of wireless data transmission. Because of security and maintenance issues, among other things, ad hoc wireless networks have may not be used in various applications for which the networks might otherwise be suitable.

BRIEF SUMMARY OF THE INVENTION

Embodiments of methods and devices are disclosed for enabling network devices to join a network. These embodiments generally include a first network device, which is joined to the network, sending authentication information. If the authentication information is determined as valid by a second network device, the second network device sends a join request toward the first network device. During or after the joining process, the first and second network devices can share scheduling information. These embodiments enable a network to have additional security while consuming low amounts of power.

According to one embodiment, a method is provided for enabling network devices to join a low-power wireless network. The method includes sending, with a first network device, authentication information relating to the low-power wireless network. The first network device can be joined with the low-power wireless network, and the authentication information can be sent wirelessly toward a second network device. The method also includes receiving the authentication information with the second network device, the second network device not being joined with the low-power wireless network. Additionally, the method includes determining, with the second network device, that the authentication information is valid, and sending, with the second network device, a request to join the low-power wireless network. The request to join the low-power wireless network can comprise a unique identifier of the second network device, can be sent wirelessly toward the first network device, and can be sent after determining, with the second network device, that the authentication information is valid.

This embodiment can include one or more variations. For example, the method can include sending sensor information with the second network device where the sensor information is sent after the request to join the low-power wireless network is sent, and the sensor information is sent wirelessly toward the first network device. The method can include receiving, with the second network device, the sensor information from at least one sensor communicatively coupled with the second network device. The method can further include determining, with the first network device, a plurality of schedules; sending scheduling data wirelessly with the first network device, the scheduling data indicative of the plurality of schedules; receiving the scheduling data with the second network device; determining, with the second network device, the plurality of schedules; selecting, with the second network device, a schedule from the plurality of schedules; and sending selection data wirelessly with the second network device, the selection data indicative of the selected schedule.

This embodiment can include additional variations. For instance, the scheduling data can include a plurality of identifiers, each identifier indicating a corresponding schedule of the plurality of schedules, and determining the plurality of schedules with the second network device includes correlating each of the plurality of identifiers with the corresponding schedule. The scheduling data can be indicative of a radio frequency (RF) channel associated with each of a plurality of time slots associated with the plurality of schedules. The method can include sending slowdown data wirelessly with the first network device, where the slowdown data is indicative of a slowdown factor; receiving the slowdown data with the second network device; and reducing a frequency of subsequent communications between the first network device and the second network device based, at least in part, on the slowdown factor. At least one of the subsequent communications can correspond to the selected schedule. The authentication information can comprise a first set of authentication information relating to the low-power wireless network, and the method further can include sending, with the second network device, a second set of authentication information relating to the low-power wireless network. The second network device can use a time value in determining that the authentication information is valid. Finally, the method can include generating the time value, with the second network device, using synchronization data received wirelessly from the first network device.

In a second embodiment, a network device is provided for communicating sensor information. The network device can include a battery, a wireless interface, and a processing unit, communicatively coupled with the battery and the wireless interface. The processing unit can be configured to detect, using the wireless interface, authentication information relating to a network, and determine that the authentication information is valid. The processing unit further can be configured to send, using the wireless interface, a request to join the network. The request to join the network can comprise a unique identifier of the network device, and can be sent after the network device determines that the authentication information is valid.

This second embodiment can include various alternate features. For example, the network device can include at least one sensor communicatively coupled with the processing unit. The processing unit further can be configured to determine, using scheduling data received with the wireless interface, a plurality of schedules; select a schedule from the plurality of schedules; and send, using the wireless interface, selection data indicative of the selected schedule. The network device can include a memory, where information indicative of the schedule is stored in the memory, determining the plurality of schedules includes identifying a plurality of identifiers in the scheduling data (each identifier can indicate a corresponding schedule), and correlating each identifier with the corresponding schedule.

The second embodiment can include yet further features. For example, the wireless interface can be configured to send data using a plurality of radio frequency (RF) channels, and determining the plurality of schedules can include identifying an RF channel associated with each of a plurality of time slots associated with the plurality of schedules. The processing unit can be further configured to determine, using slowdown data received with the wireless interface, where the slowdown data is indicative of a slowdown factor; and reduce a frequency of subsequent data communications with the wireless interface based, at least in part, on the slowdown factor. At least one of the subsequent data communications can correspond to the selected schedule. The network device can use less than 2 milliwatts (mW) of power. The authentication information can include a first set of authentication information relating to the network, and the processing unit can be further configured to cause the network device to send, using the wireless interface, a second set of authentication information relating to the network. The processing unit can be further configured to provide a time value, and the time value can be used in determining that the authentication information is valid. Finally, the processing unit can be further configured to generate the time value based, at least in part, on synchronization data received with the wireless interface.

A third embodiment includes a network device for communicating sensor information. The network device can include a battery, a wireless interface, and a processing unit, communicatively coupled with the battery and the wireless interface. The processing unit can be configured to send, using the wireless interface, authentication information relating to a network, and detect, using the wireless interface, a request to join the network. The request to join the network can comprise a unique identifier of a second network device, and can be detected after authentication information is sent.

The third embodiment can include one or more variations described herein. For example, the processing unit can be further configured to detecting sensor information with the wireless interface where the sensor information is sent after the request to join the network is sent. The network device can include least one sensor communicatively coupled with the processing unit. The processing unit can be further configured to determine a plurality of schedules; send, using the wireless interface, scheduling data, where the scheduling data is indicative of the plurality of schedules; and detect, using the wireless interface, selection data, where the selection data indicative of a selected schedule. The network device further can include a memory for storing information indicative of the schedule, and the processing unit can be further configured to include a plurality of identifiers in the scheduling data, where each of the plurality of identifiers corresponds to a schedule of the plurality of schedules.

Additional variations can be made to the third embodiment. For instance, the wireless interface can be configured to send data using a plurality of RF channels, and the processing unit can be further configured to include, in the scheduling data, information regarding an RF channel associated with each of a plurality of time slots associated with the plurality of schedules. The processing unit can be further configured to determine a slowdown factor; send, using the wireless interface, slowdown data indicative of the slowdown factor; and reduce a frequency of subsequent data communications with the wireless interface based, at least in part, on the slowdown factor. At least one of the subsequent data communications can correspond to the selected schedule. The network device can use less than 2 milliwatts (mW) of power. The processing unit can be further configured to provide a time value where the time value is used to create the authentication information. Finally, the processing unit can be further configured to use the wireless interface to send synchronization data based, at least in part, on the time value.

DETAILED DESCRIPTION OF THE INVENTION

Figure 1A:
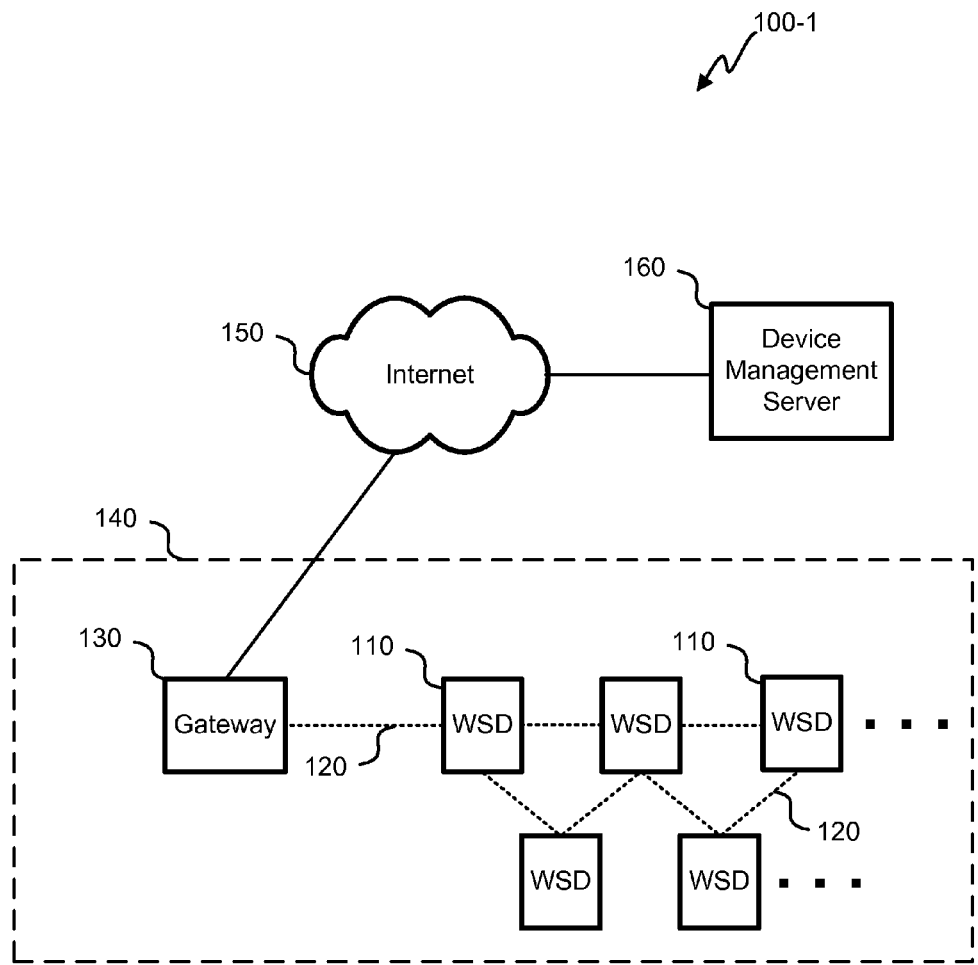
FIG. 1A is a block diagram of an embodiment of a wireless network for communicating sensor information.

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Wireless networks and wireless network devices (including wireless sensor devices (WSDs)) described herein may be configured in a variety of ways, in a variety of contexts. Example configurations include mesh, point-to-point, and/or ad hoc networks, among others. The flexible nature of these networks—enabling nodes to join and leave these networks dynamically—together with WSDs configured to collect and communicate sensor information, enables these networks to provide end-to-end security and management of transportation and/or logistical systems. Although disclosed embodiments focus on wireless technologies, the techniques described herein can be applied to wired communication networks, such as an ad-hoc serial interface, for example.

For example, a wireless network can comprise a plurality of WSDs providing sensor information relating to a plurality of cargo containers located in a depot. The sensor information can include data from a variety of sensors, which can indicate the temperature and/or humidity of a container, whether the container door is or has been opened, whether the container is experiencing or has experienced a shock, the location of the container, whether the container is moving, and more. The wireless network further can include a gateway device that collects the sensor information and provides it to systems outside the wireless network. As WSD-equipped containers enter and leave the depot, the wireless network will adjust accordingly, enabling WSDs of containers entering the depot to join the wireless network while the WSDs of containers leaving the depot are dropped from the wireless network. Furthermore, WSDs can act as routers to relay sensor information from other WSDs that are not in direct communication with the depot's gateway device.

Low-power wireless networks can be advantageous in transportation, logistical, and similar applications where network devices are mobile devices operating on battery power. Although many battery-operated mobile devices utilize wireless technologies, most mobile devices exhaust their batteries in a matter of hours or days. The term "low-power wireless networks" as used herein refers to wireless networks utilizing technologies that enable battery-powered devices to operate for a year or more without exhausting their batteries. This can include technologies associated with the IEEE 802.15.4 and/or ISO/IEC 18000-7 standards, as well as various proprietary technologies, among others.

FIG. 1A is a block diagram of an embodiment of a logistical management system 100-1. In this embodiment, a plurality of WSDs 110 are networked together to generate and communicate sensor data. A WSD 110 gathering sensor information can communicate the sensor information toward a gateway 130 using a wireless connection 120. If there are one or more WSDs 110 communicatively linked between the WSD 110 originating the sensor information and the gateway 130, the one or more WSDs 110 will relay the sensor information until it reaches the gateway 130. The logistical management system 100-1 depicted in FIG. 1A is shown as an example and is not limiting. The sensor network 140 can be configured in a variety of ways. For instance, the gateway 130 can connect with multiple WSDs 110, and WSDs 110 can have more or fewer wireless connections 120 than indicated in FIG. 1A. Moreover, multiple gateways 130 and/or sensor networks 140 may be included in a logistical management system.

The gateway 130 provides connectivity between sensor network 140—comprising the gateway 130 and WSDs 110—and a device management server (DMS) 160. Communication between the gateway 130 and the DMS 160 can be relayed through the Internet 150, or any other Wide Area Network (WAN). Additionally or alternatively, other networks, such as Local Area Networks (LANs), can be used. Other configurations can include a gateway 130 communicating directly with the DMS 160 without a separate network.

The DMS 160 provides an interface between the sensor network 140 that can be used by a human user or another system, by utilizing, for example, a graphical user interface (GUI) and/or an application programmable interface (API). The DMS 160 can collect and store information from the WSDs 110. The data communicated between the DMS 160 and the gateway 130 can be securely communicated in encrypted packets, and the DMS 160 can provide secure management of the collected data.

One or more of a variety of physical layers may be used to provide the wireless connections 120 of the sensor network 140. According to one embodiment, the WSDs 110 and gateway 130 communicate using a protocol stack based on IEEE 802.15.4 standard at 2.4 GHz using all 16 channels available in that standard. This physical layer enables the sensor network 140 to operate using very low power and/or predictable power consumption—which can be an important consideration for embodiments in which the WSDs 110 and/or gateway 130 operate on battery power. Nonetheless, other wireless technologies may be used, including IEEE 802.15.4 at 900 MHz; IEEE 802.11; Bluetooth®; IEEE 802.16; Ultra Wideband (UWB); 433 MHz Industrial, Scientific, and Medical (ISM) Band; cellular; optical; and more, using use multiple RF channels (e.g., narrow-band frequency hopping) or a single RF channel. The gateway 130 can communicate with the Internet 150 through a wired connection and/or a wireless connection, as shown in FIG. 1B.

Figure 1B:
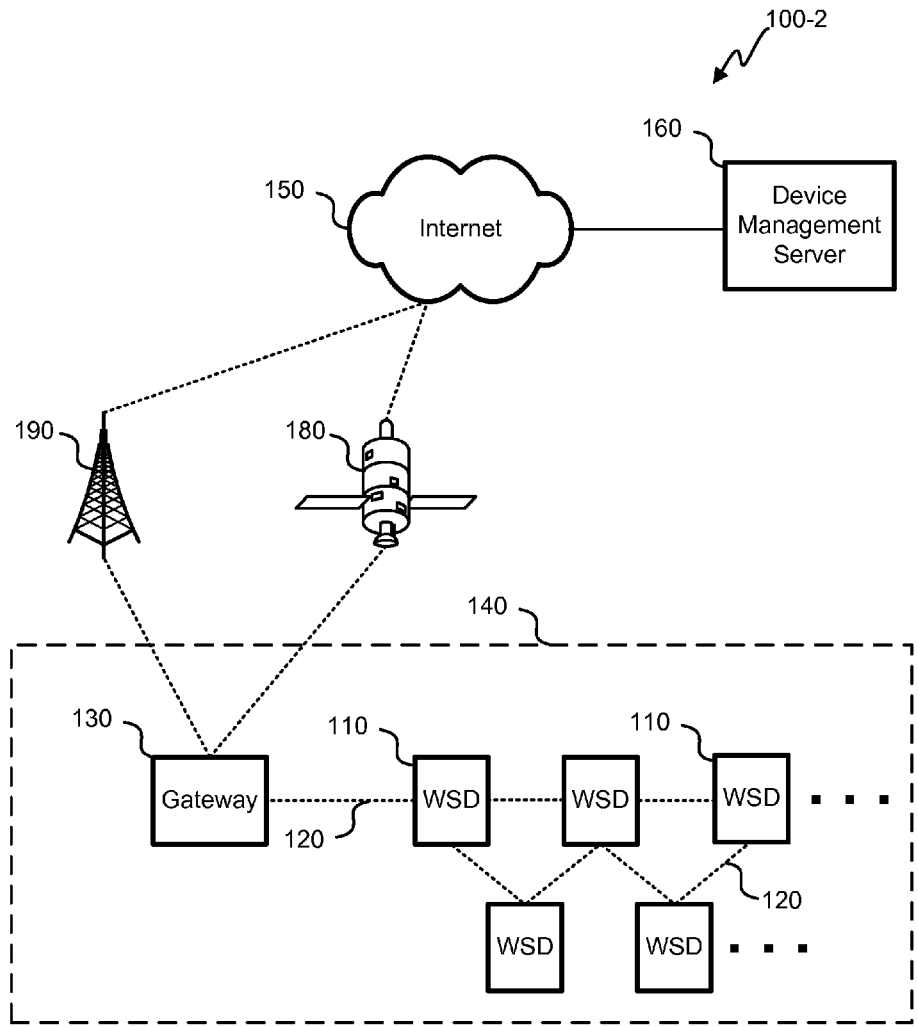
FIG. 1B is a block diagram of another embodiment of a wireless network for communicating sensor information, in which a gateway device is wirelessly connected with the Internet.

FIG. 1B is a block diagram of an alternative embodiment of a logistical management system 100-2. In this embodiment, the gateway 130 can communicate with the Internet 150 wirelessly, through wireless communications with a satellite 180 and/or a cellular tower 190. The user of such a wireless interface between the gateway 130 and the internet 150 can be a factor of available internet connectivity and desired mobility of the sensor network 140, among other considerations.

Figure 2:
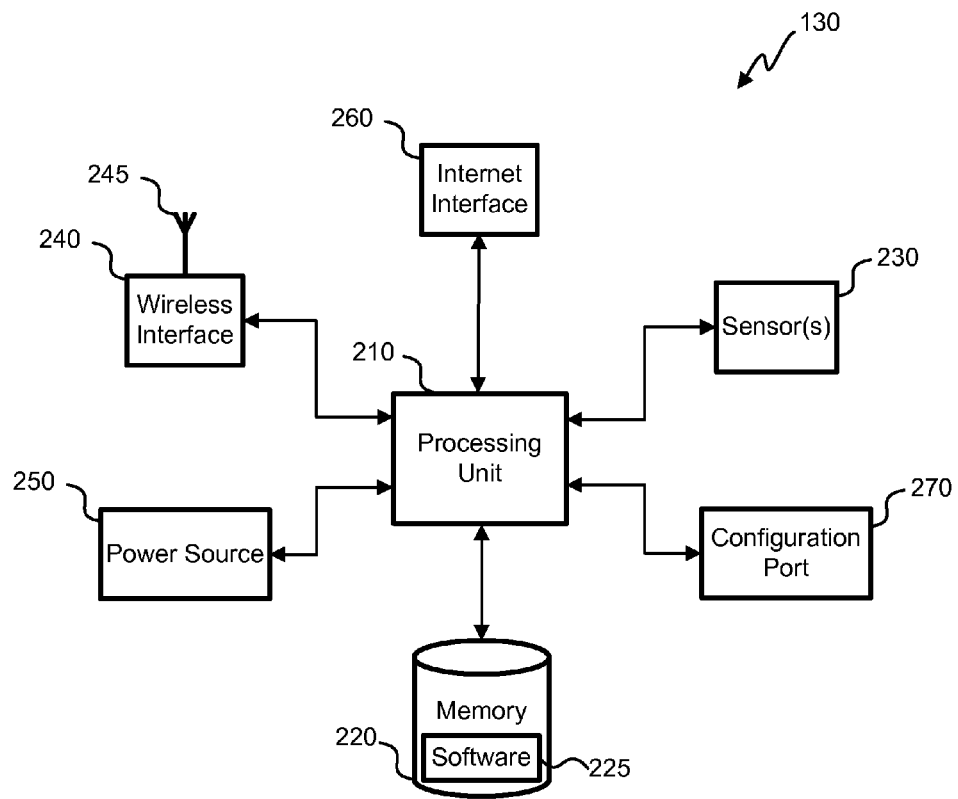
FIG. 2 is a block diagram of an embodiment of a gateway device.

FIG. 2 is a block diagram of an embodiment of a gateway device 130. This block diagram, as with other figures shown herein, is provided as an example only, and is not limiting. The gateway device 130 can be configured in alternate ways by, for example, including a global positioning system (GPS) unit and/or other components not shown in FIG. 2.

A processing unit 210 lies and the heart of the gateway device 130. The processing unit 210 can be comprised of one or more processors, microprocessors, and/or specialized integrated circuits. The processing unit 210 can gather information from the other components of the gateway device 130 and process the information in accordance with software 225 disposed in memory 220. Depending on desired functionality of the gateway device 130 and the capabilities of the processing unit 210, the software 225 can include an operating system with one or more executable programs. Alternatively, the software can include lower-level instructions, such as firmware and/or microcode, for the processing unit 210 to execute.

The power source 250 supplies power to the components of the gateway device 130 and may provide additional information (e.g., battery charge, voltage levels, etc.) to the processing unit 210. For a mobile gateway device 130, the power source 250 can comprise one or more batteries. For a fixed gateway device 130, the power source can include a power converter, transformer, and/or voltage regulator.

The wireless interface 240 provides communication with WSDs 110. As indicated above, this communication can be effectuated using any of a variety of technologies, including radio frequency (RF) and/or optical communication technologies. Where RF technologies are used, the wireless interface can include an antenna 245.

The gateway device 130 can also include a configuration port 270, which can allow a device, such as a computer, to be connected to the gateway device 130 for the purposes of configuring the gateway device 130. The configuration port 270 can comprise universal serial bus (USB) connector, serial port, optical, or other connector to input information from an external device. Depending on the functionality of the gateway device 130 and/or WSDs 110, the configuration port 270 may be used to configure device information and reporting, sensor parameters, software, security, network parameters, power consumption, GPS parameters, file management, and more.

The Internet interface 260 can be any of a variety of interfaces, depending on desired functionality. As indicated in FIG. 1A, the gateway device 130 can have a wired connection with the Internet, in which case the Internet interface 260 can include an Ethernet or other wired interface. Additionally or alternatively, the gateway device 130 can have a wireless connection with the Internet, as indicated in FIG. 1B. In this case, the Internet interface can comprise one or more wireless radios, such as a dual-mode WAN radio enabling cellular and satellite communication.

The gateway device 130 further can include sensor(s) 230, enabling the gateway device to collect sensor information similar to the WSDs. This sensor information can include information relating to temperature, humidity, motion, light, battery charge, shock, and application-specific information (e.g. the state of a door—open or closed—on a cargo container). Depending on desired functionality, the processing unit 210 may collect, process, and/or record the sensor information, or the processing unit 210 simply may send unprocessed sensor information to the DMS 160 using the Internet interface 260.

Figure 3:
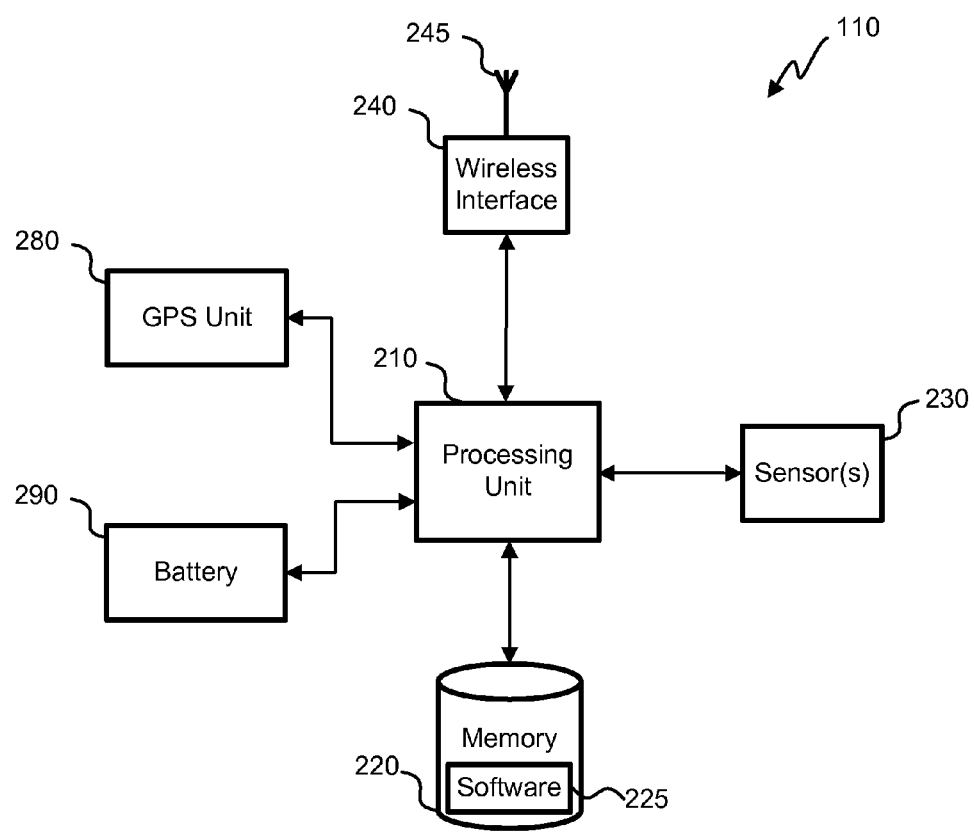
FIG. 3 is a block diagram of an embodiment of a wireless sensor device (WSD).

FIG. 3 is a block diagram of an embodiment of a WSD 110. This embodiment includes many components—such as the sensor(s) 230, processing unit 210, memory 220, and wireless interface 240—that are similar to the gateway device 130. Here, however, the components may be simpler than corresponding components of the gateway device 130, due to power and functionality considerations. For example, the processing unit 210 can comprise a microprocessor and the memory 220 and software 225 can comprise programmed logic of the microprocessor. It can also be noted that the WSD 110 and/or the gateway device can include an interface (not shown) to provide a user with information. Such an interface can comprise a liquid-crystal display (LCD), one or more light emitting diodes (LEDs), etc.

WSD 110 further includes a battery 290. Because the wireless network can provide lower-power consumption, a battery having a long shelf life—such as an alkaline-, silver-oxide-, or lithium-based battery—can provide for operability of the WSD 110 without the need to change batteries for several years. According to one embodiment, a WSD 110 uses up to 4 A-size 3.6 volt (V) batteries, each battery rated at approximately 3600 milliamp hours (mAh). Some embodiments of the WSD 110 have an operating power of under 2 milliwatts (mW); other embodiments of the WSD operate under 1 mW. Therefore, depending on the battery's shelf life and capacity, as well as the configuration of the WSD 110, the WSD 110 can operate for 10 years or more without the need to change the battery.

The WSD 110 can also include a GPS unit 280 to provide location information. Location information can be particularly useful where a sensor network 140 is spread over a large physical area. Moreover, the GPS unit 280 further can be used to sense motion of the WSD 110 by determining, by the GPS unit 280 and/or the processing unit 210 a change in location over time.

Figure 4:
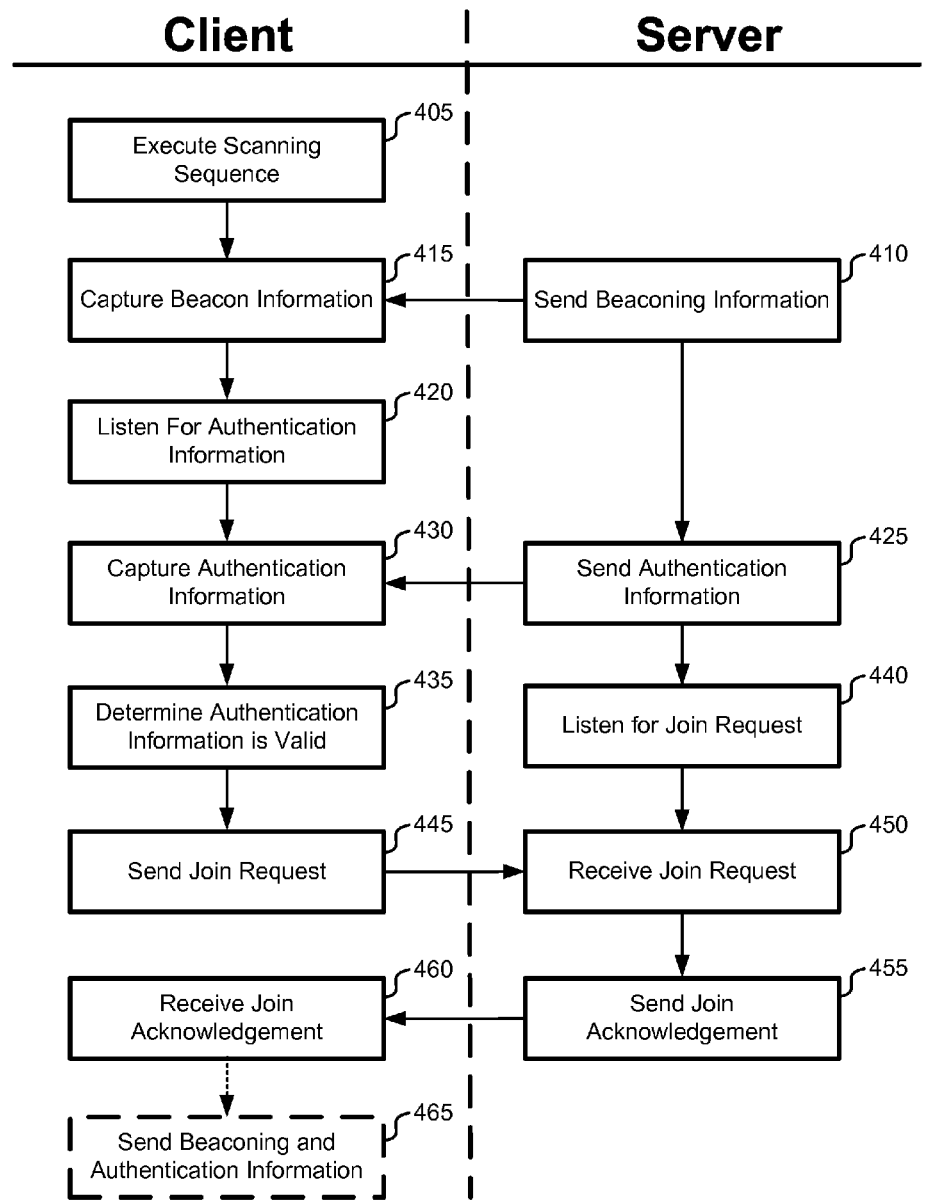
FIG. 4 is a swim-lane diagram illustrating a joining sequence between client and server network devices, according to one embodiment.

FIG. 4 is a is a swim-lane diagram illustrating a joining sequence between a client and a server, according to one embodiment. Here, the server can be a WSD 110 or gateway 130 currently joined with a sensor network 140 (or other wireless network), and the client can be a WSD 110 not joined with the sensor network 140, but is scanning for and attempting to join the sensor network 140.

At block 405, the client executes a scanning sequence. For a client not joined to a sensor network, the client can initiate the scanning sequence periodically for a certain period of time. For clients enabled to communicate over multiple frequency channels, the client can scan multiple channels. Depending on the functionality of the client, a multiple-channel scan may be conducted by scanning each channel in sequence. In order to capture complete beacon information from a server, the scanning period can be as long or longer than the corresponding beacon period. If only part of the beacon information is received by the client, and where the server is configured to send multiple sets of beacon information, the client can extend the scanning period to receive a full set of beacon information. Additionally or alternatively, the server can beacon over multiple channels while the client scans a single channel.

At block 410, the server sends beaconing information, which is captured by the client at block 415. As stated above, in a beaconing sequence, the server can be configured to send multiple sets of beacon information. In other words, the beaconing sequence can comprise a series of data packets. The data packets can be numbered such that the client, after having received a set of beacon information, can stop scanning and enter a sleep mode until the beaconing sequence has ended. For example, a server's beaconing sequence can comprise data packets that include a number of a countdown sequence (e.g., counting down from some number to zero). If the client captures a data packet having the number 195, the client can enter a low-power sleep mode, enabling it to conserve power while the server continues to send out the remaining 195 data packets of the beaconing sequence.

Rather than responding to the server's beaconing sequence, as traditional systems typically require, the client in this embodiment awaits further information from the server. At block 420, the client listens for an authentication packet (i.e., a data packet comprising authentication information), which is sent by the server at block 425. Continuing with the example above where the client enters a sleep mode after capturing a beaconing packet, the client can awake from the sleep mode to listen for the authentication packet. Based on the number of the data packet received, the client can time the length of the sleep mode to correspond with the length of the beaconing sequence. When the client determines that the beaconing sequence is over (or nearly over) the client can then awake, and the server can send out authentication information. According to some embodiments, there is no randomization for client responses, so packet collisions can be expected if there is more than one client responding to a server's authentication packet. By trying to maintain a fixed time for the authentication packet, the server can maintain a predictable low-power profile. In addition, or as an alternative, to these techniques, Carrier Sense Multiple Access with Collision Avoidance (CSMA-CA) and/or CSMA with Collision Detection (CSMA-CD) techniques can be used.

Unlike many networks, which require authentication information from a device attempting to join the network, the sensor network 140 can be configured such that the device attempting to join the network authenticates information from a device or devices that are already a part of the network. This "do not speak unless spoken to" technique can not only promote power savings, but ensure security. For example, a rogue system attempting to hack or otherwise steal information from a client cannot draw any information from the client—or even sense the presence of the client—without first sending authentication information that is then captured and authenticated by the client.

At blocks 430 and 435, the client captures the authentication information, and determines that the authentication information is valid. Authentication information can comprise a variety of information, which can be specific to the sensor network 140. The information can be encrypted for security, and can be time-sensitive to help prevent replay attacks. Both client and server can have clocks that enable the time-sensitive encryption and decryption of the authentication information. Because client and server may not be synchronized, the client can allow for a certain margin of error in the time value embedded within the authentication information. Because there is not a need for an exchange of information between the client and server during authentication, the process allows for "single-packet" authentication. That is, authentication information sent from the server and authenticated by the client may comprise a single data packet, without the need for additional data exchange.

At block 440, the server listens for a join request. Because the client may not have sent any information at this point, there may not be any indication to the server that there is a client that is attempting to join the network. Therefore, as a matter of course, the server can be configured to listen for a join request once a sufficient amount of time has passed since the authentication information was sent for the authentication information to be captured and authenticated by the client.

The actual joining process can vary, depending on the desired functionality of the sensor network 140. That said, it generally can follow blocks 445-460. Specifically, the client can send a join request at block 445, which is received by the server at block 450. The server can then send a join acknowledgement at block 455, which is received by the client at block 460. Once successfully joined to the network, the client can then send sensor or other information to the server, as a functioning node of the network. Additionally, the client can send beaconing and authentication information, at block 465 enabling additional would-be clients to join the network, in which case the client would function as a server, and the process depicted in FIG. 4 is repeated with a would-be client.

As part of the joining process, or at another point while the client is joined with the sensor network 140, the client can send a unique identifier to the server. The unique identifier, which can be hard-coded in the client, similar to a serial number, can be used to uniquely identify the client on the sensor network 140. Where the server (or other device, such as the gateway 130) determines that the identifier is not unique, different measures can be taken. Such measures include refusing to allow the client to join the sensor network 140, dropping another device with the same identifier from the sensor network 140, sending a flag or other message to the DMS 160, etc.

The join process depicted in FIG. 4 can vary, depending on desired functionality. According to one embodiment, the process of joining can take less than 5 minutes for a single client to join the sensor network 140 using a single server. The process can take an average of 1 minute or less in other situations where, for example, 5 clients attempt to join the sensor network 140 using a single server. In other embodiments using lower power, the joining process can take longer than 5 minutes.

As indicated above, nodes of the sensor network 140 can enable new nodes to join the sensor network 140 through beaconing and scanning functionality. Additionally, the nodes can operate to maintain the wireless connections 120 they have established with other nodes. Depending on desired functionality, a node can have any number of wireless connections 120 with other nodes. For instance, a WSD 110 can have a wireless connection with two parent nodes: a primary parent node and a secondary parent node. Here, "parent node" can be a server node through which the WSD 110, acting as a client, joined the network. More generally, "parent node" is an "upstream" node through which data from the WSD 110 (or any other "child" node) is relayed to get to the gateway 130. For WSDs 110 wirelessly connected directly with the gateway 130, the gateway 130 acts as a parent node.

Maintaining established wireless connections 120 can be facilitated with the exchange of scheduling data between a server node and a client node. This exchange may take place during the process by which the client joins the network. In the process depicted in FIG. 4, for instance, a server may send a client scheduling data at block 455, as part of the join acknowledgement 455. Alternatively, scheduling data can be sent before or after the acknowledgement is sent by the server.

Figure 5A:
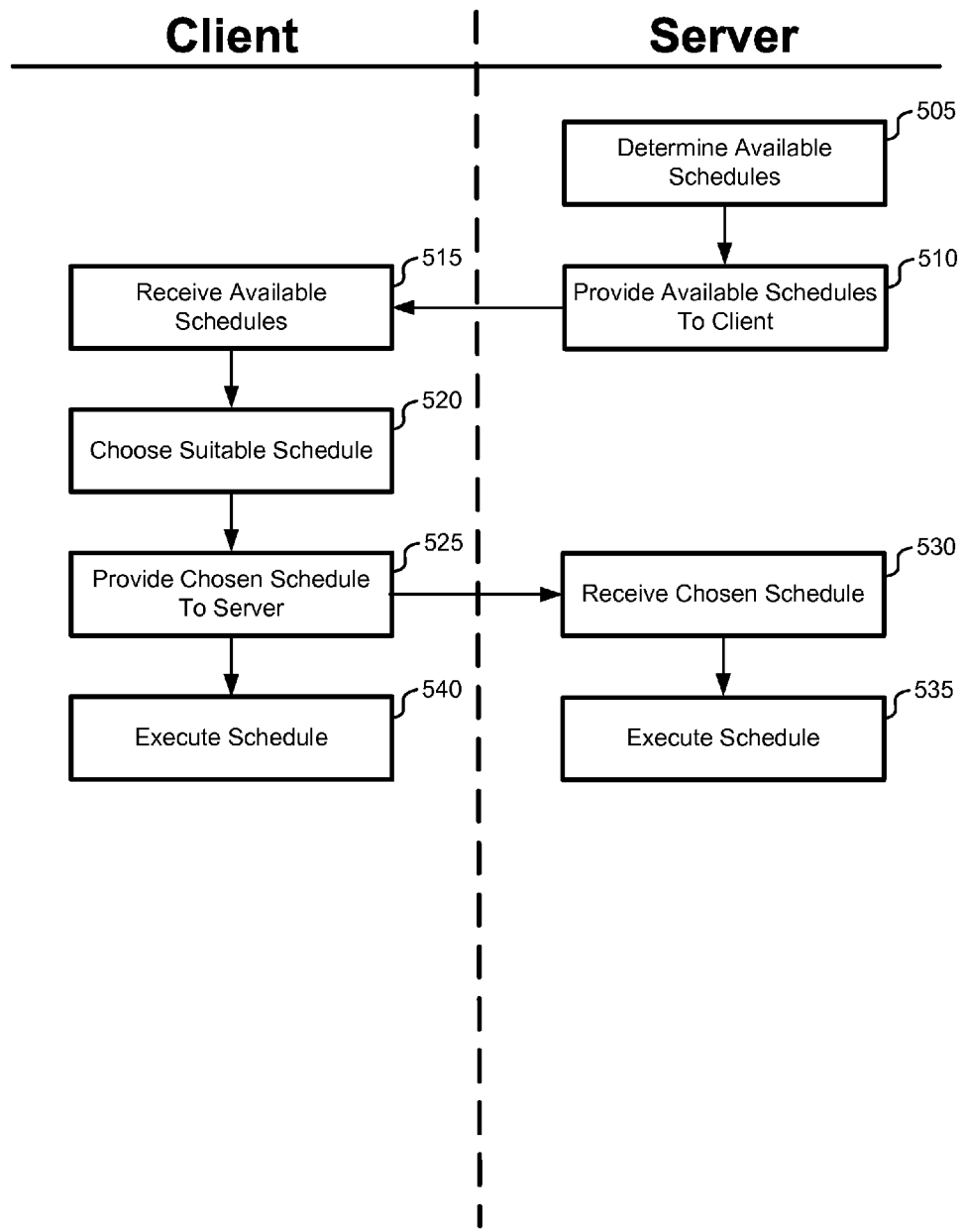
FIG. 5A is a swim-lane diagram of one embodiment of a method for exchanging scheduling information between client and server nodes.

FIG. 5A is a swim-lane diagram of one embodiment of a method for exchanging scheduling information between client and server nodes. Although scheduling information can be exchanged at any time, exchanging schedule information during the process in which the client joins the network can help reduce power consumption. At block 505, the server determines available schedules. Besides availability (in light of the servers connection with other nodes), this determination can be based on a variety of factors, such as adjacency to an occupied time slot, channel frequency, and other factors than can affect efficiency.

To help ensure accuracy of the execution of a schedule and/or the accuracy of time-stamped encryption, each link between a client and a server can be synchronized. Synchronization can occur periodically or on an as-needed basis, depending on the functionality of the nodes. One method of synchronization can occur between server and client nodes during scheduled communication times, in which case the server can communicate a time value, which is used by the client to synchronize with the to the server accordingly. Additionally or alternatively, certain communication times can be dedicated to synchronization. Because scanning and beaconing occurs between nodes that are not joined, synchronization is not necessary between nodes for these functions.

Each client can synchronize to a server on a per-link basis. For example, if a client has established a link with two servers—a primary server and a secondary server—the client can synchronize each link by tracking a time differential between each server's clock and the clock of the client. Furthermore, to further improve accuracy of synchronization, a client can determine a trend in the difference between the client's clock and a server's clock. In other words, a client can be configured to recognize a difference between a time value provided by a server and a corresponding time value for the client and determine a rate at which the difference is increasing or decreasing.

At block 510, the server provides the available schedules to the client, and these schedules are received by the client at block 515. The number of schedules provided by the server can be fixed. Alternatively, the number of schedules can vary depending on the number of available schedules of the server, a mode of operation, or other factors.

At block 520, the client chooses a suitable schedule. As with the server's determination of available schedules, the client's choice of a suitable schedule can depend on any number of factors that may affect power consumption and/or transmission efficiency. The client can take additional steps (not shown) if no schedule is suitable. For instance, the client can indicate to the server that no steps are suitable, in which case the server can determine a new set of available schedules. Additionally or alternatively, the client can choose a schedule and negotiate a new schedule with the node with which the client was scheduled to communicate during the chosen schedule.

Once the schedule is chosen, the client provides the schedule to the server at block 525, and the server receives it at block 530. The server and client both execute communications in accordance with the schedule at blocks 535 and 540, respectively. Additionally, the "do not speak until spoken to" method of joining, as described above, can be utilized at each individual time slot of a schedule. Thus, for each subsequent communication between the server and the client, the server can send an authentication packet to which the client responds only after the client properly authenticates the corresponding authentication data.

Many applications for sensor networks 140 prioritize low and/or predictable power consumption. By minimizing the amount of information transferred, among other things, the server and client nodes—and the sensor network 140 in general—can reduce power consumption.

Figure 5B:
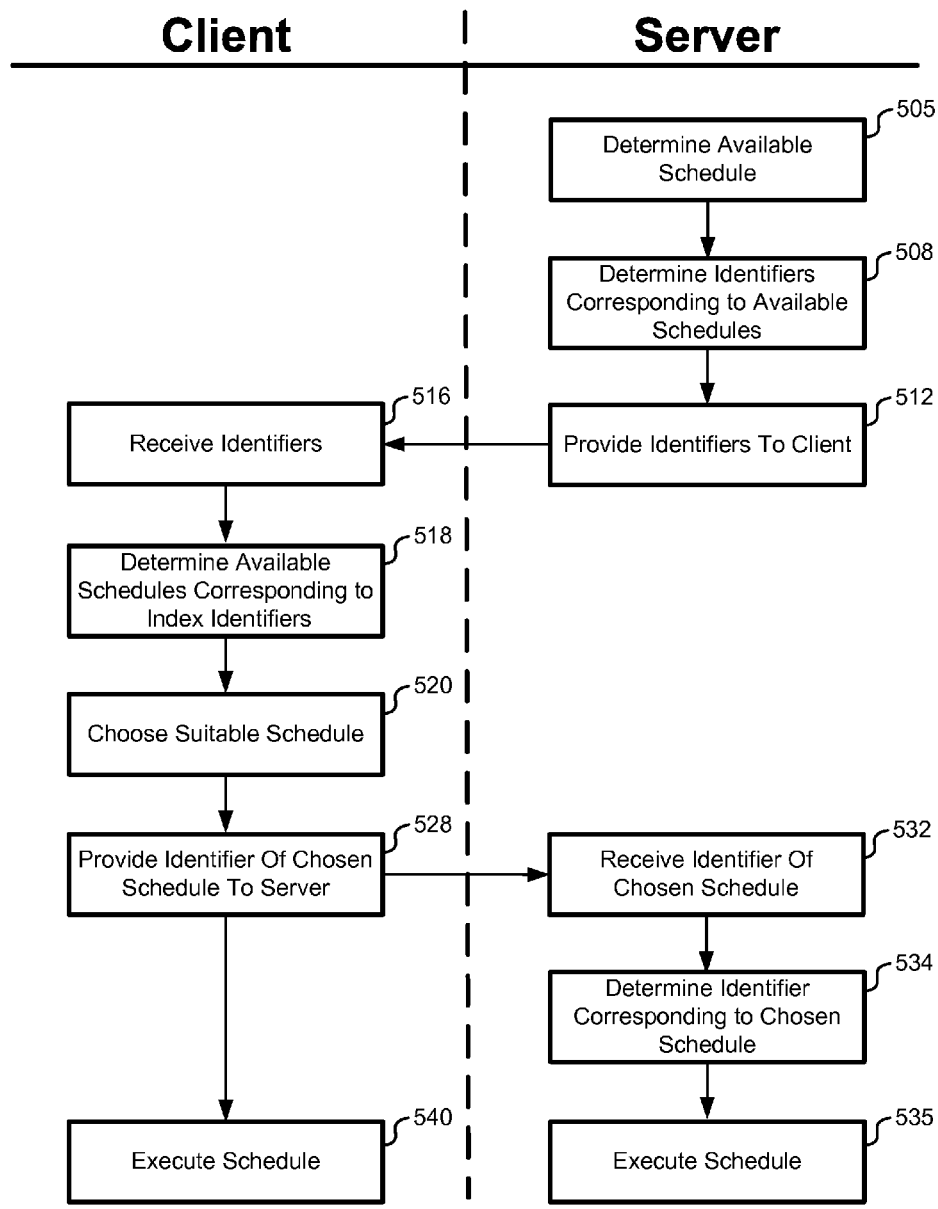
FIG. 5B is a swim-lane diagram of an alternative embodiment of a method for exchanging scheduling information between client and server nodes.

FIG. 5B is a swim-lane diagram of an alternative embodiment of a method for exchanging scheduling information between client and server nodes that helps minimize the amount of information transferred. Specifically, both client and server have information indicative of predetermined schedules stored in memory, thereby enabling the scheduling data to comprise identifier(s) corresponding to the predetermined schedule(s). The information indicative of the predetermined schedule(s) can be encoded in read-only memory, or it may be encoded in re-writable memory. In the latter case, information indicative of a new schedule(s) can be circulated among the nodes of the sensor network 140 (originating at, for example, the gateway 130), enabling the sensor network to update the predetermined schedule information on each connected node.

In the embodiment depicted in FIG. 5B, once the server determines available schedules, at block 505, it determines identifiers corresponding to the available schedules at block 508. At block 512, the server provides the identifiers to the client. For example, a server can determine 3 available schedules having numerical identifiers ranging from 0 to 127. If the server determines that schedules corresponding to identifiers 12, 57, and 146 are available, it can send these identifiers to the client without the need to send any additional information regarding the schedules.

The client receives the identifiers at block 516, and, at block 518, uses the information indicative of the predetermined schedules to determine the available schedules corresponding to the identifiers. As with the method depicted in FIG. 5A, the client then chooses a suitable schedule at block 520, and then provides the identifier of the chosen schedule to the server at block 528.

At block 532, the server receives the identifier of the chosen schedule, and, at block 534, determines the identifier corresponding to the chosen schedule. Finally, the server and client execute the schedule by exchanging information during the corresponding time slots, in accordance with the schedule, at blocks 535 and 540, respectively.

Figure 6:
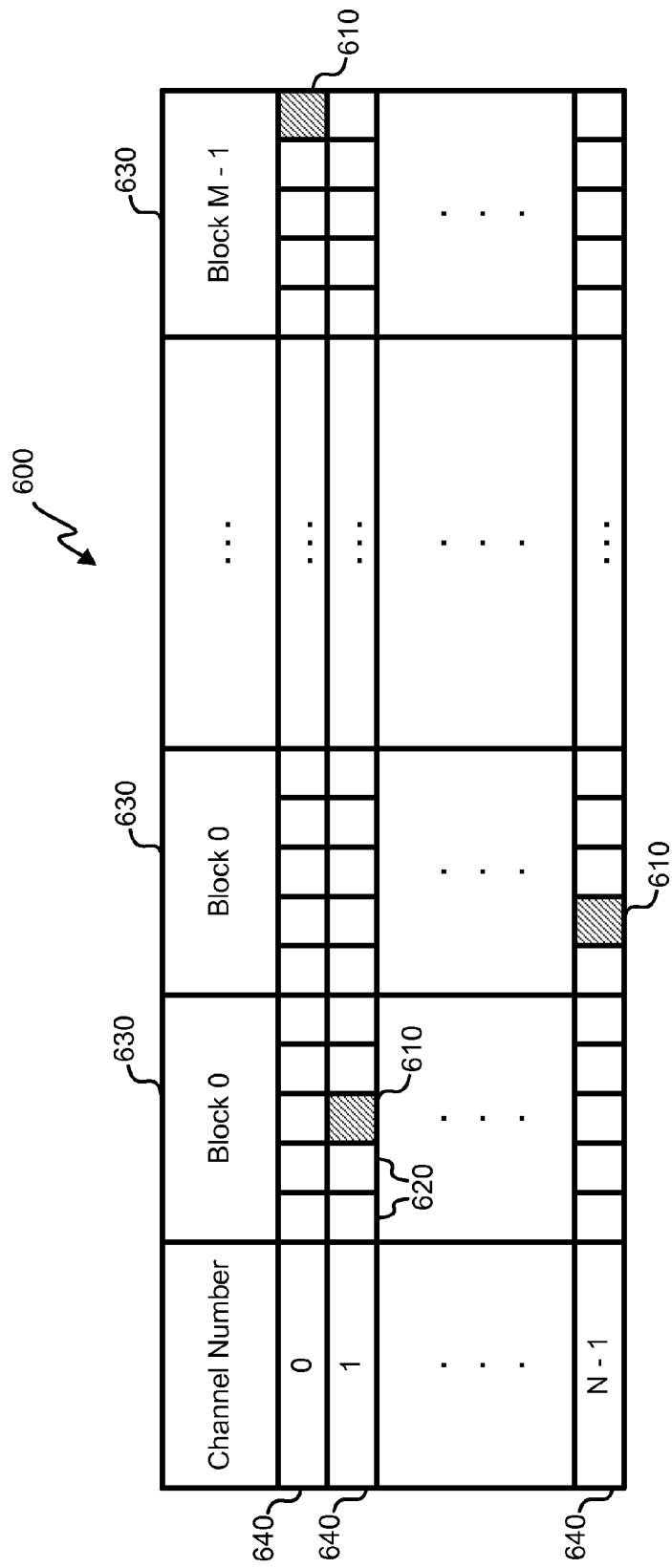
FIG. 6 is a simplified representation of a schedule, according to one embodiment.

FIG. 6 is a simplified representation of a schedule 600, according to one embodiment. One goal of the schedule 600 set is to create communication sequences spread sufficiently enough in both time and RF space to avoid collisions. The schedule represents a frame comprising M number of session blocks 630 and N number of RF channels 640. Each block can include K time slots 620, which can be a fixed length. Some criteria to determine K can be a power budget, clock accuracy, and a maximum latency or a minimum throughput. The total number of available slots in a schedule may limit the number of nodes in an RF space (without further adjustments to the schedule). For example, according to the schedule 600 of FIG. 6, the maximum number of nodes in an RF space can be limited to N×M. According to some embodiments, time slots 610 of a schedule are chosen to reduce the possibility of conflicts by having one time slot 620 per block 630, where each block 630 corresponds to a different channel 640.

Just as schedules can be predetermined and referred to with identifiers, the time slots in a schedule also can be indexed and referred to with index identifiers. For example, where N=M=16, and K=256, a schedule could be determined block-by-block as (slot/channel) 27/2; 122/0; 251/13; 99/10; . . . ; 167/8, for a total of 16 (the number of blocks). Additionally, if nodes may not be capable of communicating on different channels at the same time, schedules can be determined to reflect this limitation. For example, time slots may be used only once among all schedules. In a system having 128 pre-determined pseudo-random schedules, for instance, no two schedules will have the same time slot taken (e.g., 144/4 and 144/12).

Communication exchange between two nodes can occur once per block. In one embodiment, a block can occur every 2 seconds. However, a "slowdown" factor can be used to shift the value of the nodes' clocks before calculating a schedule. Thus, slowdown information indicative of a slowdown factor can be exchanged between a server and a client, enabling the server and client to reduce the slowdown when there is more data to exchange, and allowing the client and server to increase the slowdown when there is less data to exchange. In the embodiment where a block (or, more specifically, a time slot for communication between server and client) occurs every 2 seconds, for example, a slowdown factor of "0" can correlate to the 2-second schedule, and slowdown factors of 1, 2, 3, 4, and 5 correlate to 4-, 8-, 16-, 32-, and 64-second schedules. Slowdown factors of over 5 can be used, but may require advanced clock synchronization and adjusted guard time. Slowdown information indicative of a slowdown factor can be exchanged from server to client during the exchange of scheduling information, at other predetermined communication time periods, and/or as needed, depending on the functionality of the sensor network 140. The use of slowdown information in this manner can significantly reduce the power consumption and increase the battery life of the nodes involved.

Figure 7:
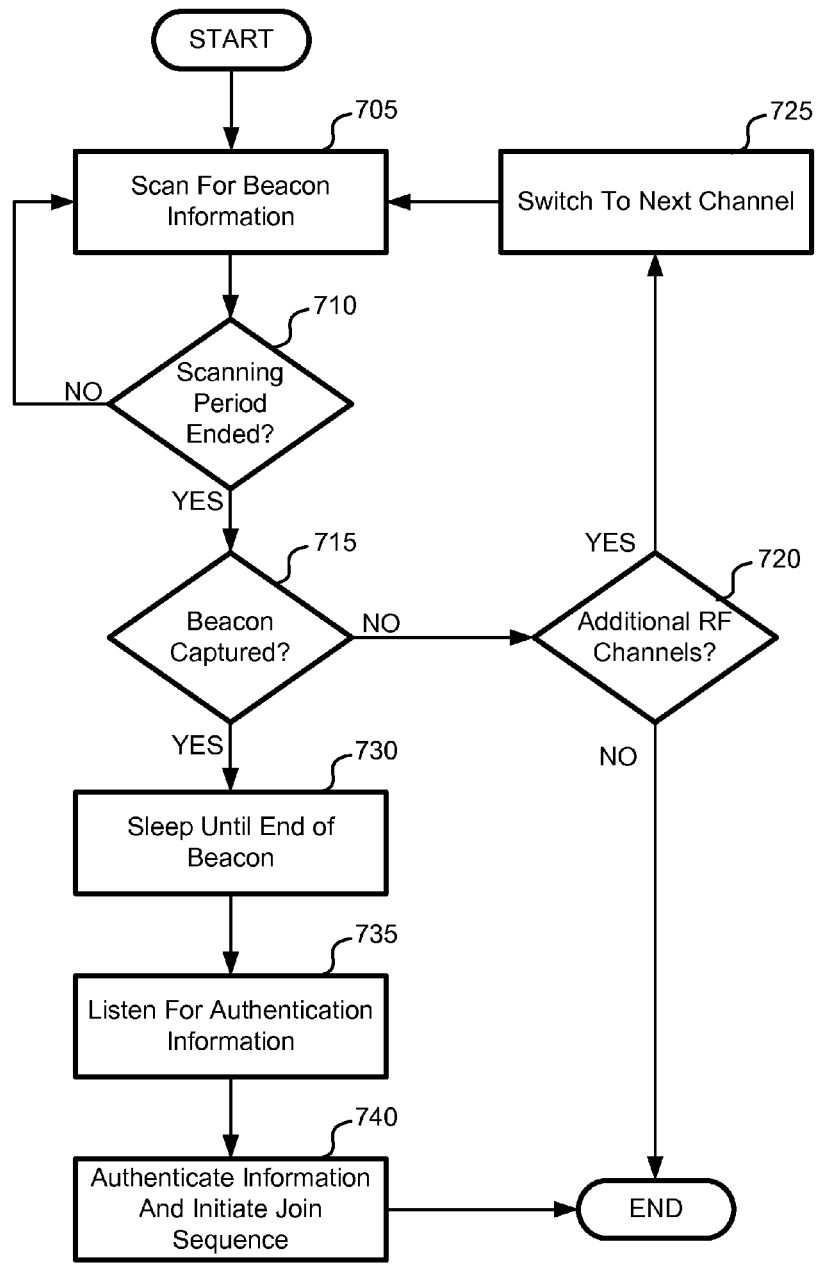
FIG. 7 is a flow diagram illustrating a method for scanning and joining a wireless network, according to one embodiment.

FIG. 7 is a flow diagram illustrating a method for scanning and joining a wireless network, according to one embodiment, which correlates to the blocks of FIG. 4 executed by the client. As with other figures shown herein, the method depicted in FIG. 7 is not limiting. Other embodiments can have additional blocks, fewer blocks, or repeated blocks, depending on desired functionality.

At block 705, a scan is conducted to detect beacon information. At block 710, scanning is repeated (back to block 705) until the scanning period has ended. At block 715, if a beacon is not captured, it is determined whether there are additional RF channels to scan. If so, the process proceeds to blocks 725 and 705, where the next channel in the scanning sequence is scanned. If there are no additional RF channels, the process ends. A client running this process, for example, can then enter a low-power sleep mode until a subsequent scanning sequence is scheduled.

At block 730, where a beacon is captured, a client running the process can enter a low-power sleep mode until the beaconing process has ended or a server is otherwise scheduled to send authentication information. At block 735, a client can listen for authentication information, and at 740, authentication information that is received is authenticated. If the authentication information is determined to be valid, a join sequence can be initiated, and the scanning process ends.

Figure 8:
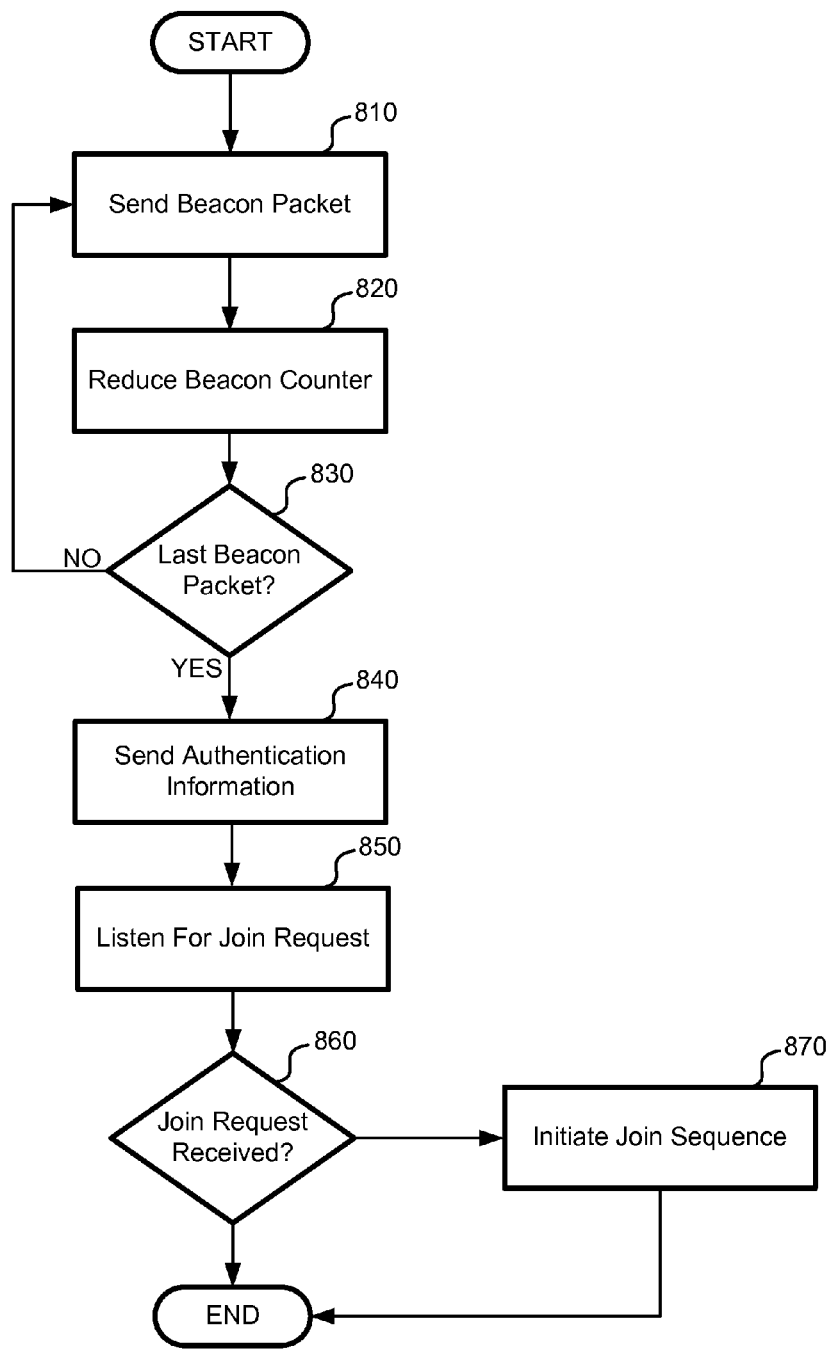
FIG. 8 is a flow diagram illustrating a method for sending beaconing and authentication information, according to one embodiment.

FIG. 8 is a flow diagram illustrating a method for sending beaconing and authentication information, according to one embodiment, which correlates to the blocks of FIG. 4 executed by the server. At block 810, a beaconing packet can be sent, and at block 820, a beacon counter is reduced. As indicated above, a beacon sequence can comprise multiple beaconing packets where each subsequent beaconing packet has a number that indicates the time at which the beacon sequence will end. In the embodiment shown in FIG. 8, each beaconing packet includes a number corresponding to the beacon counter; the last beaconing packet including the number 0. As shown in block 830, if the beaconing packet has not been sent, the process will continue, and an additional beaconing packet will be sent.

If the last beacon has been sent (e.g., if the beaconing packet with the number 0 has been sent), authentication information is sent at block 840. Authentication information can be sent immediately after the beacon sequence has concluded, or may be sent at some predetermined time afterward. At block 850, a server listens for a join request sent by a client. At block 860, if no request is received, the process ends, and the server can enter a low-power sleep mode until a subsequent beaconing sequence, or a data exchange with another node, is scheduled. Otherwise, if a join request is received, the process continues to block 870, where the join sequence is initiated and the beaconing sequence concludes.

The timing of the processes discussed herein can vary, depending on power consumption considerations and desired functionality. Scanning and beaconing sequences can be timed such that they will eventually overlap, enabling a client to capture at least one beaconing packet. As indicated above, depending partially on the frequency of overlap between beaconing and scanning sequences, the time from when a WSD 110 enters an RF space of a sensor network 140 to when the WSD 110 joins the sensor network can be 5 minutes or less, in some embodiments. Additionally, embodiments include latency times generally above 0.25 seconds, such as 2, 4, 8, 16, 32, and 64 seconds. Moreover, although bandwidth can vary, in some embodiments it is generally less than 256 bytes per second (Bps). Other embodiments include bandwidth of roughly 4, 8, and 16 Bps. Still other embodiments enable bandwidth of 64, 128, and 256 Bps.

The timing of scanning and beaconing sequences can influence the rate and reliability at which WSDs 110 join a sensor network 140. To ensure a predictable pattern of joining, the following equations can be implemented in beaconing and scanning patterns:

$$BSD \geq 10 \times SSD \quad (1)$$

$$SSP = K \times BSD \quad (2)$$

$$BSP = rounddown\left(\frac{\left(\frac{JP}{K}\right)}{SSP}\right) \times SSP + BSD \quad (3)$$

$$BSP = rounddown\left(\frac{\left(\frac{JP}{K}\right)}{SSP}\right) \times SSP - BSD \quad (4)$$

Where BSD is beaconing sequence duration, BSP is beaconing sequence period, SSD is scanning sequence duration, SSP is scanning sequence period, JP is a desired approximate joining period, and K is an integer. Both equations (3) and (4) produce valid results. For example, for a BSD=100 milliseconds (ms), K=3, and JP=10,000 ms, the resulting SSP would be 300 ms and the BSP would be 3,400 ms or 3,200 ms. Where a BSD=120 ms, K=21, and JP=300,000 ms, the resulting SSP would be 2,520 ms and the BSP would be 12,720 ms or 12,480 ms.

Although embodiments herein frequently are disclosed in the context of sensor networks, they are not limited to sensor networks, nor are they limited to transportation or logistical applications. Methods and devices disclosed herein can apply to wireless networks communicating information other than sensor information, such as identification, time, security, and/or location information. Indeed, any number of wireless networks can utilize the features disclosed herein for added security and lower power consumption, predictable and consistent power consumption, and other benefits. Along these lines, the WSDs disclosed herein are not limiting. Network devices utilizing the features disclosed herein may not gather or transmit sensor data.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-readable instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A method for enabling network devices to join a low-power wireless network, the method comprising:
sending, with a first network device, beaconing information indicative of a time when authentication information will be sent;
sending, with the first network device, the authentication information relating to the low-power wireless network wherein:
the first network device is joined with the low-power wireless network,
the low-power wireless network includes a plurality of network devices,
the authentication information is sent prior to receiving any communication from a second network device, and
the authentication information is sent wirelessly toward the second network device;
receiving the authentication information with the second network device, the second network device not being joined with the low-power wireless network;
determining, with the second network device, that the authentication information is valid;
sending, with the second network device, a request to join the low-power wireless network, wherein the request to join the low-power wireless network:
comprises a unique identifier of the second network device,
is sent wirelessly toward the first network device, and
is sent after determining, with the second network device, that the authentication information is valid;
determining, with the first network device, a plurality of schedules;
sending scheduling data wirelessly with the first network device, the scheduling data indicative of the plurality of schedules;
receiving the scheduling data with the second network device;
determining, with the second network device, the plurality of schedules;
selecting, with the second network device, a schedule from the plurality of schedules;
sending selection data wirelessly with the second network device, the selection data indicative of the selected schedule;
sending slowdown data wirelessly with the first network device, wherein the slowdown data is indicative of a slowdown factor;
receiving the slowdown data with the second network device; and
reducing a frequency of subsequent communications between the first network device and the second network device based, at least in part, on the slowdown factor.

2. The method for enabling network devices to join the low-power wireless network recited in claim 1, further comprising sending sensor information with the second network device wherein:
the sensor information is sent after the request to join the low-power wireless network is sent, and
the sensor information is sent wirelessly toward the first network device.

3. The method for enabling network devices to join the low-power wireless network recited in claim 2, further comprising receiving, with the second network device, the sensor information from at least one sensor communicatively coupled with the second network device.

4. The method for enabling network devices to join the low-power wireless network recited in claim 1, wherein:
the scheduling data comprises a plurality of identifiers, each identifier indicating a corresponding schedule of the plurality of schedules; and
determining the plurality of schedules with the second network device includes correlating each of the plurality of identifiers with the corresponding schedule.

5. The method for enabling network devices to join the low-power wireless network recited in claim 1, wherein the scheduling data further is indicative of a radio frequency (RF) channel associated with each of a plurality of time slots associated with the plurality of schedules.

6. The method for enabling network devices to join the low-power wireless network recited in claim 1, wherein at least one of the subsequent communications corresponds to the selected schedule.

7. The method for enabling network devices to join the low-power wireless network recited in claim 1, wherein the authentication information comprises a first set of authentication information relating to the low-power wireless network, further comprising
sending, with the second network device, a second set of authentication information relating to the low-power wireless network.

8. The method for enabling network devices to join the low-power wireless network recited in claim 1, wherein the second network device uses a time value in determining that the authentication information is valid.

9. The method for enabling network devices to join the low-power wireless network recited in claim 8, further comprising generating the time value, with the second network device, using synchronization data received wirelessly from the first network device.

10. A network device for communicating sensor information, the network device comprising:
a battery;
a wireless interface;
a processing unit, communicatively coupled with the battery and the wireless interface, configured to:
detect, using the wireless interface, beaconing information indicative of a time when authentication information relating to a network will be sent;
detect, using the wireless interface, the authentication information relating to the network prior to sending any communication to the network;
determine that the authentication information is valid;
send, using the wireless interface, a request to join the network, wherein the request to join the network:
comprises a unique identifier of the network device,
is sent after the network device determines that the authentication information is valid, and
the network includes a plurality of network devices;
determine, using scheduling data received with the wireless interface, a plurality of schedules;
select a schedule from the plurality of schedules;
send, using the wireless interface, selection data indicative of the selected schedule;
determine, using slowdown data received with the wireless interface, wherein the slowdown data is indicative of a slowdown factor; and
reduce a frequency of subsequent data communications with the wireless interface based, at least in part, on the slowdown factor.

11. The network device for communicating sensor information recited in claim 10, further comprising at least one sensor communicatively coupled with the processing unit.

12. The network device for communicating sensor information recited in claim 10, further comprising a memory, wherein:
information indicative of the schedule is stored in the memory; and
determining the plurality of schedules includes:
identifying a plurality of identifiers in the scheduling data, wherein each identifier indicates a corresponding schedule; and
correlating each identifier with the corresponding schedule.

13. The network device for communicating sensor information recited in claim 10, wherein:
the wireless interface is configured to send data using a plurality of radio frequency (RF) channels; and
determining the plurality of schedules includes identifying an RF channel associated with each of a plurality of time slots associated with the plurality of schedules.

14. The network device for communicating sensor information recited in claim 10, wherein at least one of the subsequent data communications corresponds to the selected schedule.

15. The network device for communicating sensor information recited in claim 10, wherein the network device uses less than 2 milliwatts (mW) of power.

16. The network device for communicating sensor information recited in claim 10, wherein:
the authentication information comprises a first set of authentication information relating to the network; and
the processing unit is further configured to cause the network device to send, using the wireless interface, a second set of authentication information relating to the network.

17. The network device for communicating sensor information recited in claim 10, wherein:
the processing unit is further configured to provide a time value; and
the time value is used in determining that the authentication information is valid.

18. The network device for communicating sensor information recited in claim 17, wherein the processing unit is further configured to generate the time value based, at least in part, on synchronization data received with the wireless interface.

19. A network device for communicating sensor information, the network device comprising:
a battery;
a wireless interface;
a processing unit, communicatively coupled with the battery and the wireless interface, configured to:
send, using the wireless interface, beaconing information indicative of a time when authentication information relating to a network will be sent;
send, using the wireless interface, the authentication information relating to the network prior to receiving any communication from a second network device;
detect, using the wireless interface, a request to join the network, wherein the request to join the network:
comprises a unique identifier of the second network device,
is detected after authentication information is sent,
the network includes a plurality of network devices;
determine a plurality of schedules;
send, using the wireless interface, scheduling data, wherein the scheduling data is indicative of the plurality of schedules;
detect, using the wireless interface, selection data, wherein the selection data indicative of a selected schedule;
determine a slowdown factor;
send, using the wireless interface, slowdown data indicative of the slowdown factor; and
reduce a frequency of subsequent data communications with the wireless interface based, at least in part, on the slowdown factor.

20. The network device for communicating sensor information recited in claim 19, wherein the processing unit is further configured to detecting sensor information with the wireless interface wherein the sensor information is sent after the request to join the network is sent.

21. The network device for communicating sensor information recited in claim 19, further comprising at least one sensor communicatively coupled with the processing unit.

22. The network device for communicating sensor information recited in claim 19, further comprising a memory storing information indicative of the schedule; and
the processing unit is further configured to include a plurality of identifiers in the scheduling data, wherein each of the plurality of identifiers corresponds to a schedule of the plurality of schedules.

23. The network device for communicating sensor information recited in claim 19, wherein:
the wireless interface is configured to send data using a plurality of radio frequency (RF) channels; and
the processing unit is further configured to include, in the scheduling data, information regarding an RF channel associated with each of a plurality of time slots associated with the plurality of schedules.

24. The network device for communicating sensor information recited in claim 19, wherein at least one of the subsequent data communications corresponds to the selected schedule.

25. The network device for communicating sensor information recited in claim 19, wherein the network device uses less than 2 milliwatts (mW) of power.

26. The network device for communicating sensor information recited in claim 19, wherein:
the processing unit is further configured to provide a time value; and
the time value is used to create the authentication information.

27. The network device for communicating sensor information recited in claim 26, wherein the processing unit is further configured to use the wireless interface to send synchronization data based, at least in part, on the time value.

* * * * *